Aug. 29, 1950 C. E. LOMAX 2,520,644

REPEATER SWITCHING TELEPHONE SYSTEM

Filed Feb. 27, 1948 3 Sheets-Sheet 1

*INVENTOR.*
Clarence E. Lomax

*BY*
Smith, Olsen & Baird
Attys.

INVENTOR.
Clarence E. Lomax
BY
Smith, Olsen & Baird
Attys.

REPEATER SWITCHING TELEPHONE SYSTEM

*INVENTOR.*

Clarence E. Lomax

*BY*

Smith, Olsen & Baird

Attys.

Patented Aug. 29, 1950 2,520,644

UNITED STATES PATENT OFFICE 2,520,644

REPEATER SWITCHING TELEPHONE SYSTEM

Clarence E. Lomax, Chicago, Ill., assignor to Automatic Electric Laboratories, Inc., Chicago, Ill., a corporation of Delaware Application February 27, 1948, Serial No. 11,435

5 Claims. (Cl. 179—27)

The present invention relates to automatic telephone systems, and more particularly, to such systems incorporating repeater switching arrangements.

It is a general object of the present invention to provide in an automatic telephone system an improved repeater switching arrangement in which calls either from a calling operator switchboard or from a calling telephone station may be routed via switching apparatus and a common channel through a repeater to a called operator position, wherein the supervision from the repeater back over the calling route incident to answering of the call at the called operator position is selectively set by the switching apparatus in accordance with the origin of the call.

Another object of the invention is to provide in a repeater switching arrangement of the character noted, an improved arrangement for selectively controlling from the switching apparatus a supervisory relay provided in the repeater so that answer supervision is appropriately set in the repeater in accordance with the origin of the call.

A further object of the invention is to provide in an automatic telephone system an improved automatic switch and an improved repeater accessible thereto, wherein reverse battery supervision from the repeater over the switch is selectively controlled in accordance with the operation of the switch to select the repeater via a common channel.

Further features of the invention pertain to the particular arrangement of the circuit elements of the system, wherein the above-outlined and additional operating features thereof are attained.

Figure 1:
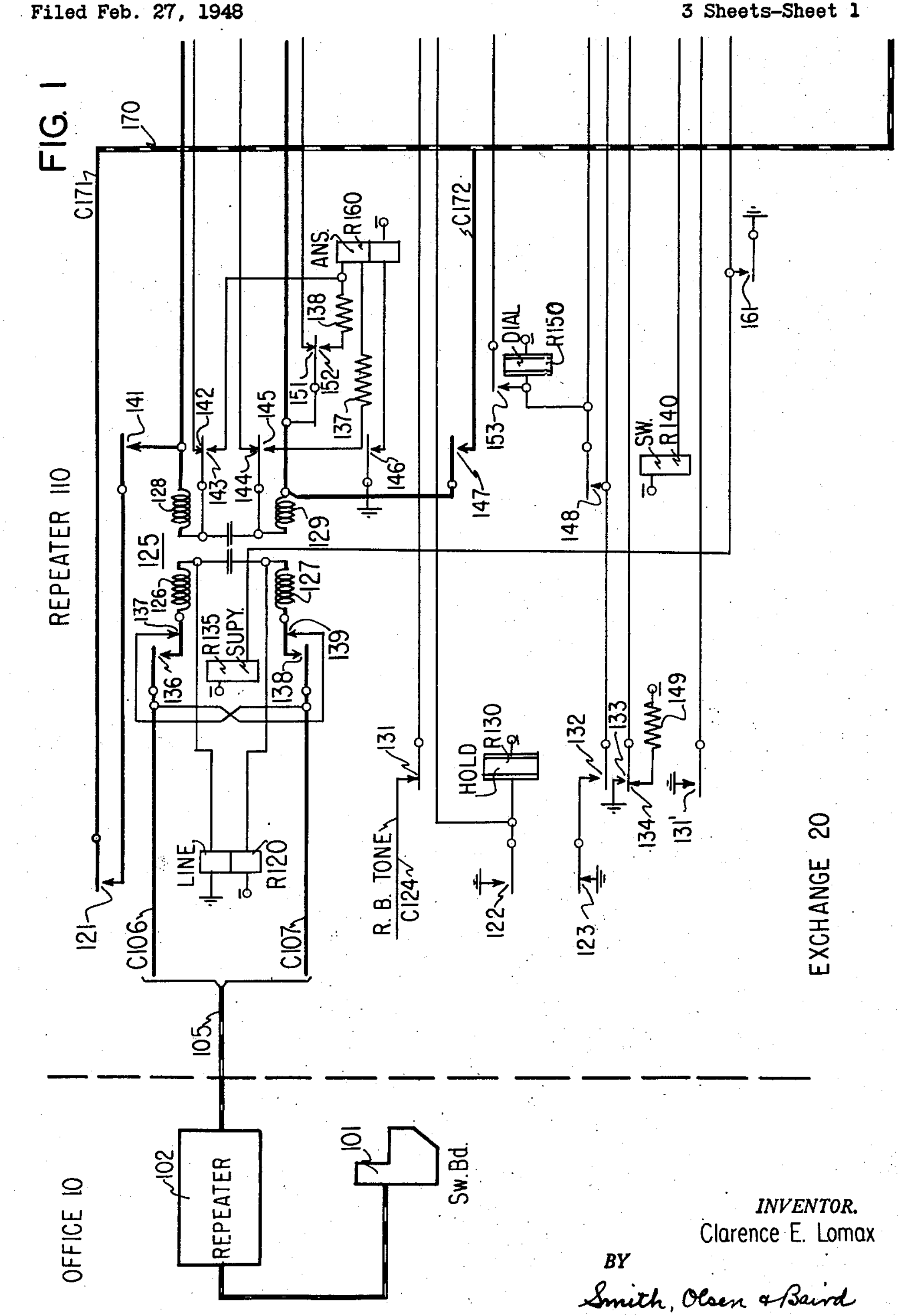
Figure 2:
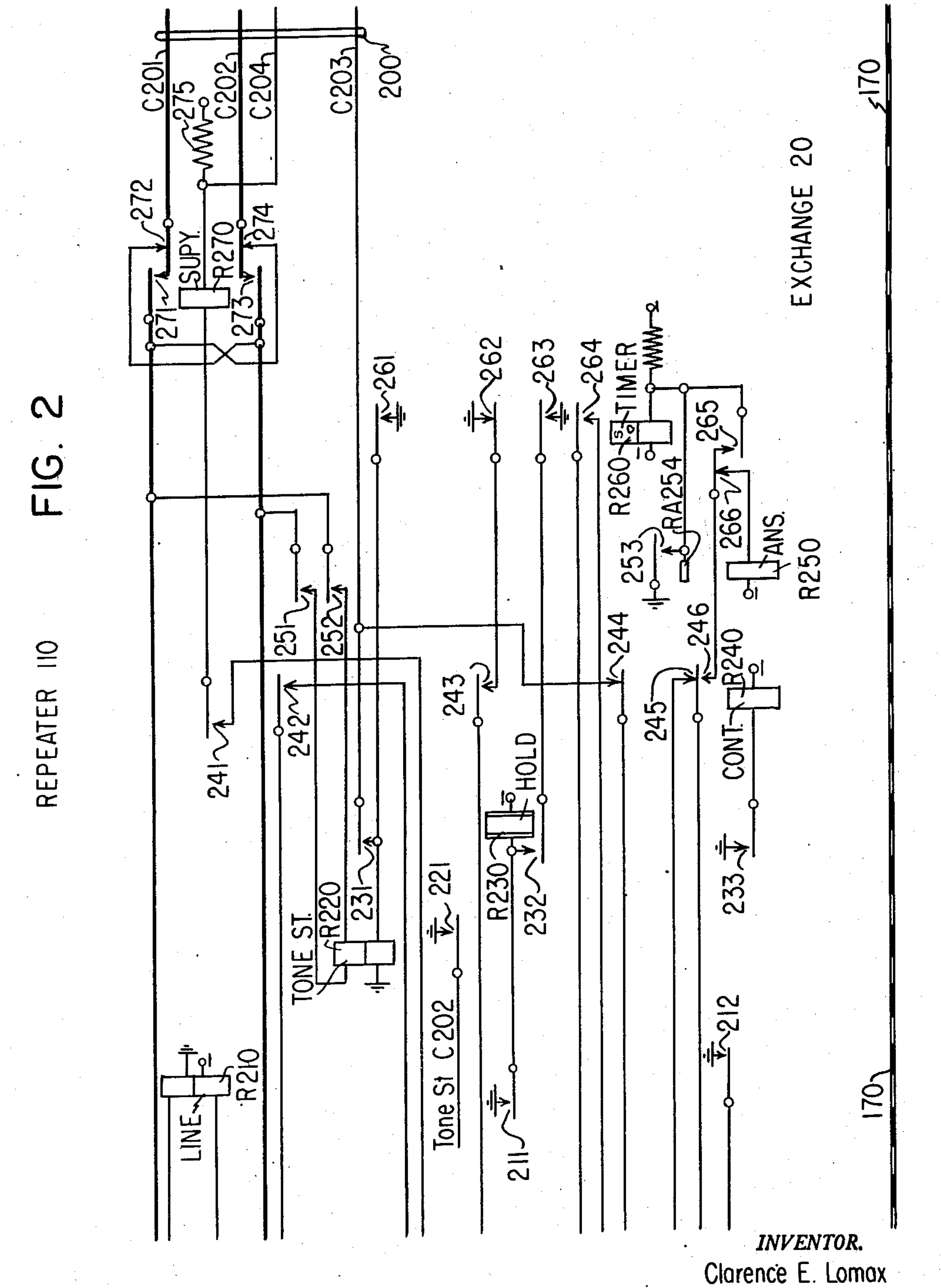
Figure 3:
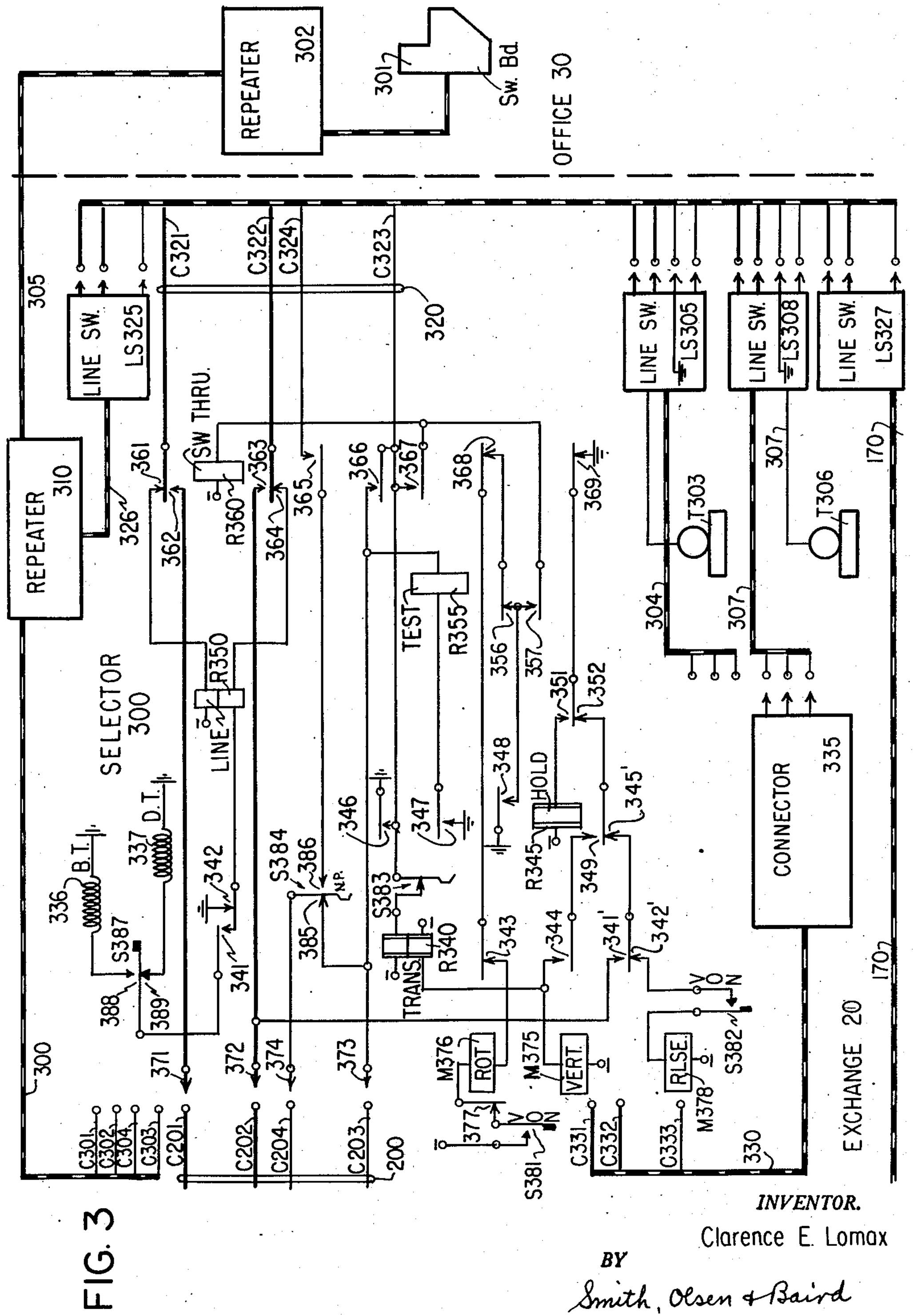

The invention, both as to its organization and method of operation, together with further objects and advantages thereof, will best be understood by reference to the following specification taken in connection with the accompanying drawings, in which Figures 1 to 3, inclusive, taken together, illustrate the details of an automatic telephone system having incorporated therein the features of the present invention. Specifically, Figs. 1 to 3, inclusive, should be arranged from left to right in the order named and in end-to-end relation.

Referring now more particularly to the drawings, there is illustrated an automatic telephone system comprising an office 10, an exchange 20 and an office 30. The office 10 may be of any suitable type including an operator switchboard 101; the office 30 may be of any suitable type including an operator switchboard 301; and the exchange 20 is of the automatic type serving a number of subscriber substations, not shown, and a number of paystations T303 and T306. The paystations T303 and T306, etc., may be of any conventional type such, for example, as that disclosed in U. S. Patent No. 2,137,407, granted on November 22, 1938, to Talbot G. Martin and Clarence E. Lomax. The exchange 20 occupies a tandem position with respect to the offices 10 and 30 and may constitute a community automatic exchange or C. A. X. The office 10 and the exchange 20 are interconnected by a group of trunk lines, including the trunk line 105; and the office 30 and the exchange 20 are interconnected by a group of trunk lines, including the trunk line 305.

The opposite ends of the trunk lines 105, etc., terminate in repeaters respectively disposed in the office 10 and in the exchange 20, the trunk line 105 terminating in the repeater 102 disposed in the office 10 and in the repeater 110 disposed in the exchange 20. Similarly, the opposite ends of the trunk lines 305, etc., terminate in repeaters respectively disposed in the office 30 and in the exchange 20, the trunk line 305 terminating in the repeater 302 disposed in the office 30 and in the repeater 310 disposed in the exchange 20. The switchboard 101 may be of any suitable manual dial type and has access to the repeaters 102, etc., each of which is of any suitable type. Likewise, the switchboard 301 may be of any suitable manual dial type and has access to the repeaters 302, etc., each of which is of any suitable type.

Also the exchange 20 comprises groups of connectors, one of the group including the connector 335 having access to the group of telephone lines, including the telephone lines 304 and 307 respectively extending to the paystations T303 and T306; the connectors 335, etc., being of the Strowger type. The telephone lines 304, 307, etc., are provided with line switches LS305, LS308, etc., individual thereto; and likewise, the subscriber substations are provided with subscriber lines also terminating in similar line switches, all not shown. The repeaters 110, 310, etc., are respectively provided with incoming trunks 200, 300, etc., and outgoing trunks 170, 326, etc.; the outgoing trunks 170, 326, etc., respectively terminating in line switches LS327, LS325, etc. The line switches LS305, LS308, LS327, LS325, etc. are of any suitable types. Also the exchange 20 comprises a group of selectors, including the selector S300. The selectors S300, etc., are accessible to the line switches LS325, LS305, LS308, LS327, etc., and have access to the incoming trunks 200, 300, etc., respectively extending to the repeaters 110, 310, etc., and to the connectors 335, etc.

Preferably, the repeaters 110, 310, etc., are identical; the repeater 110 comprising, as shown in Figs. 1 and 2, a repeating coil 125 and a relay group including a line relay R120, a hold relay R130, a supervisory relay R135, a switch relay R140, a dial relay R150, an answer relay R160, a line relay R210, a tone start relay R220, a hold relay R230, a control relay R240, an answer relay R250, a timer relay R260, and a supervisory relay R270.

Preferably, the selectors S300, etc., are identical; the selector S300 comprising, as shown in Fig. 3, a Strowger mechanism including four wipers 371, 372, 373, and 374, a vertical magnet M375 for driving the wiper carriage step by step in the vertical direction, a rotary magnet M376 for driving the wiper carriage step by step in the rotary direction, and a release magnet M378 for releasing the wiper carriage and for causing it to be returned to its normal rotary and vertical positions. Also associated with the wiper carriage are three sets of switch springs S381, S382 and S383 that are operated when the wiper carriage is driven one step in the vertical direction away from its normal vertical position, a set of switch springs S384 that is operated when the wiper carriage is driven predetermined numbers of steps in the vertical direction away from its normal vertical position, and a set of switch springs S387 that is operated when the wiper carriage is driven eleven steps in the rotary direction away from its normal rotary position. More particularly, the set of switch springs S384 is operated when the wiper carriage of the Strowger mechanism is driven to the levels in the associated contact bank in which the two groups of incoming trunks 200, etc., and 300, etc., are respectively terminated. Also the selector S300 comprises a relay group including a transfer relay R340, a hold reay R345, a line relay R350, a test relay R355, and a switch-through relay R360.

A better understanding of the connection and arrangement of the apparatus incorporated in the telephone system will be facilitated from a consideration of the extension of the various calls involving the offices 10 and 30 and the exchange 20.

First assuming that a call is to be extended from the calling switchboard 101 in the office 10 to the called switchboard 301 in the office 30, the operator at the calling switchboard 101 first selects an idle repeater, such for example, as the repeater 102 and connects thereto. The repeater 102 operates to complete a loop circuit via the line conductors C106 and C107 of the trunk 105, for energizing in series the upper and lower windings of the line relay R120 in the repeater 110; which loop circuit also includes the windings 126 and 127 of the repeating coil 125 and the contacts 137 and 139. When this loop circuit is thus completed, the line relay R120 operates to complete, at the contacts 122, a circuit for operating the hold relay R130. Upon operating the hold relay R130 interrupts, at the contacts 134, a normally completed path, including the contacts 244, for applying battery potential by way of the resistor 149 to the control conductor C203 of the incoming trunk 200; and completes, at the contacts 133, a substantially identical path for applying ground potential to the control conductor C203; thereby to mark the incoming trunk 200 as busy to the selectors S300, etc., having access thereto. Also the hold relay R130 completes, at the contacts 131', a circuit, including the contacts 245, for operating the switch relay R140.

Upon operating the switch relay R140 interrupts, at the contacts 142 and 144, the normal connections between the upper and lower windings of the line relay R210 and the windings 128 and 129 of the repeating coil 125; and completes, at the contacts 141, 143, 145 and 147, a path for bridging the upper winding of the answer relay R160 across the line conductors C171 and C172 of the outgoing trunk 170. The path mentioned extends from the line conductor C171 via the contacts 121 and 141, the winding 128 of the repeating coil 125, the contacts 143, the upper winding of the answer relay R160, the resistor 137, the contacts 145, the winding 129 of the repeating coil 125, and the contacts 147 to the line conductor C172. Also the switch relay R140 completes, at the contacts 146, a circuit for energizing the lower winding of the answer relay R160; whereby the latter relay is poled to operate when the upper winding thereof is substantially energized in the opposite direction, the upper winding of the answer relay R160 being presently energized via the line conductors C171 and C172 of the trunk 170 in a predetermined direction in order to prevent operation thereof. However, when the upper winding of the answer relay R160 is thus bridged across the line conductors C171 and C172 of the outgoing trunk 170 extending to the line switch LS327, operation of the line LS327 is initiated to find an idle selector S300, etc.

Assuming that the selector S300 is idle at this time, battery potential is applied via the upper winding of the transfer relay R340 and the set of switch springs S383 to the control conductor C323 of the trunk 320 extending thereto, whereby the trunk 320 is marked as idle to the line switch LS327. Assuming that the line switch LS327 selects the trunk 320 operation thereof is arrested and ground potential therein is applied to the control conductor C323 of the trunk 320, thereby energizing the upper winding of the transfer relay R340 causing the latter relay to operate. Also the line switch LS327 switches through extending the line conductors C171 and C172 of the outgoing trunk 170 through to the line conductors C321 and C322 of the trunk 320; whereby a loop circuit is completed for energizing in series the upper winding of the answer relay R160 in the repeater 110 and the upper and lower windings of the line relay R350 in the selector S300. This loop circuit extends from ground by way of the winding 337 of the dial tone transformer, the contacts 389 of the set of switch springs S387, the contacts 341, the lower winding of the line relay R350 and the contacts 364 to the line conductor C322; and from battery by way of the upper winding of the line relay R350 and the contacts 361 to the line conductor C321. At this time, the line conductors C321 and C322 of the trunk 320 are connected through the line switch LS327 to the line conductors C171 and C172 of the outgoing trunk 170, thereby completing the path back across the upper winding of the answer relay R160. When this loop circuit is thus completed, the line relay R350 in the selector S300 operates; however, the answer relay R160 does not operate as it is still not properly poled. Moreover, dial tone current is returned over this loop circuit and repeated by the windings 128 and 129 and the windings 126 and 127 of the repeating coil 125 over the trunk 105 and via the repeater 102 to the calling switchboard 101 indicating to the operator thereat that she may proceed to dial the first digit.

Upon operating the line relay R350 in the selector S300 completes, at the contacts 351, a circuit, including the contacts 369, for operating the hold relay R345. Upon operating the hold relay R345 completes, at the contacts 346, a multiple path for applying ground potential to the control conductor C323 of the trunk 320, thereby to complete an alternate holding circuit for energizing the upper winding of the transfer relay R340 and to retain the line switch LS327 in its operated position. Moreover, this application of ground potential to the control conductor C323 of the trunk 320 marks the trunk 320 and consequently the selector S300 as busy to the other line switches LS325, etc., having access thereto.

The operator at the calling switchboard 101 then proceeds to dial the single digit comprising the directory number of the called switchboard 301; whereby the repeater 102 repeats the impulses thereof over the trunk 105 to the line relay R120 in the repeater 110 causing the latter relay to follow. The first time the line relay R120 restores, it completes, at the contacts 123, a circuit, including the contacts 132 and 148, for operating the dial relay R150. Upon operating the dial relay R150 completes, at the contacts 152, a path, including the resistors 138 and 137, the contacts 145 and the windings 129 of the repeating coil 125, for short-circuiting the upper winding of the answer relay R160, thereby positively to prevent operation of the latter relay during dialing and to improve the impedance characteristic of the loop circuit extending over the outgoing trunk 170 to the line relay R350 in the selector S300. Each time the line relay R120 restores and then reoperates, it interrupts and then recompletes, at the contacts 122, the circuit for energizing the winding of the hold relay R130; whereby the latter relay remains in its operated position during impulsing as it is of the slow-to-release type. Also each time the line relay R120 operates and then restores, it interrupts and then recompletes, at the contacts 123, the circuit for energizing the winding of the dial relay R150; whereby the latter relay remains in its operated position during impulsing, as it is of the slow-to-release type. Finally, each time the line relay R120 restores and then reoperates, it interrupts and then recompletes, at the contacts 121, the loop circuit extending over the outgoing trunk 170 to the line relay R350 in the selector S300; whereby the impulses of the present digit are repeated to the line relay R350 in the selector S300 causing the latter relay to follow.

Each time the line relay R350 restores and then reoperates, it interrupts and then recompletes, at the contacts 351, the circuit for energizing the winding of the hold relay R345; whereby the latter relay is retained operated during impulsing as it is of the slow-to-release type. Also each time the line relay R350 restores and then reoperates, it completes and then interrupts, at the contacts 352, a circuit, including the contacts 369, 349 and 344, for operating the vertical magnet M375 and for energizing the lower winding of the transfer relay R340; whereby the vertical magnet M375 is operated and restored repeatedly in order to drive the wiper carriage of the Strowger mechanism step by step in the vertical direction away from its normal vertical position and the transfer relay R340 is retained in its operated position as it is of the slow-to-release type. When the wiper carriage of the Strowger mechanism is driven on step in the vertical direction away from its normal vertical position the sets of switch springs S381, S382 and S383 are operated. More particularly, the set of switch springs S383 is operated in order to interrupt the holding circuit for energizing the upper winding of the transfer relay R340; however, the latter relay is retained in its operated position during impulsing as it is of the slow-to-release type and the circuit for energizing the lower winding thereof is completed intermittently. At the conclusion of the present digit, the wiper carriage of the Strowger mechanism occupies a position adjacent to the level in the associated contact bank terminating the group of incoming trunks, including the incoming trunk 300 extending to the repeater 310, and the set of switch springs S384 is operated. More particularly, the set of switch springs S384 is operated in order to disconnect, at the contacts 385 thereof, the EC wiper 374 of the Strowger mechanism from the control wiper 373 thereof; and to prepare, at the contacts 386 thereof, a connection between the EC wiper 374 of the Strowger mechanism and the EC conductor C324 of the trunk 320. Also at the conclusion of the present digit, the line relay R120 in the repeater 110 is retained in its operated position in order to interrupt, at the contacts 123, the circuit for energizing the winding of the dial relay R150; whereby the latter relay restores shortly thereafter, it being of the slow-to-release type. Upon restoring the dial relay R150 interrupts, at the contacts 152, the path for short-circuiting the upper winding of the answer relay R160; whereby the upper winding of the answer relay R160 is again inserted in the loop circuit extending via the line conductors C171 and C172 of the outgoing trunk 170 to the line relay R350 in the selector S300. Accordingly, the line relay R350 is retained in its operated position interrupting, at the contacts 352, the circuit for energizing the lower winding of the transfer relay R340; whereby the latter relay restores shortly thereafter, it being of the slow-to-release type.

Upon restoring the transfer relay R340 interrupts, at the contacts 341, the path for applying ground potential by way of the winding 337 of the dial tone transformer and the lower winding of the line relay R350 to the line conductor C322 of the trunk 320; and completes, at the contacts 342, an alternative path for applying ground potential by way of the lower winding of the line relay R350 to the line conductor C322. Accordingly, at this time the return of dial tone current over the connection to the calling switchboard 101 is interrupted. Also upon restoring the transfer relay R340 completes, at the contacts 343, a circuit, including the contacts 348, 356, 368 and 377 and the set of switch springs S381, for operating the rotary magnet M376. Upon operating the rotary magnet M376 drives the wiper carriage of the Strowger mechanism one step in the rotary direction away from its normal rotary position; and interrupts, at the contacts 377, the operating circuit therefor. Accordingly, the wipers 371, etc., of the Strowger mechanism select the first contact set in the previously selected level in the associated contact bank terminating the first incoming trunk in the group including the incoming trunk 300; whereby the idle or busy condition of the first incoming trunk mentioned is tested by the test relay R355. More particularly, at this time ground potential is applied by way of the contacts 347 and the winding of the test relay R355 to the control wiper 373 of the Strowger mechanism, whereby the winding of the test relay R355 is short-circuited by the application of ground potential upon the control conductor of the first incoming trunk mentioned in the event this incoming trunk is busy at this time. On the other hand, in the event the first incoming trunk mentioned is idle at this time, battery potential appears upon the control conductor thereof and is applied to the control wiper 373 of the Strowger mechanism, thereby completing a circuit for energizing the winding of the test relay R355 causing the latter relay to operate. First assuming that the first incoming trunk mentioned is busy the winding of the test relay R355 is short-circuited, whereby the rotary magnet M376 upon restoring recompletes, at the contacts 377, the operating circuit therefor. Accordingly, the rotary magnet M376 operates buzzer fashion until an idle incoming trunk in the group mentioned is selected effecting operation of the test relay R355.

Now assuming that all of the incoming trunks preceding the incoming trunk 300 extending to the repeater 310 are busy at this time, the rotary magnet M376 operates buzzer fashion to drive the wiper carriage of the Strowger mechanism step by step in the rotary direction until the wiper set selects the incoming trunk 300. At this time battery potential appearing upon the control conductor C303 of the incoming trunk 300 completes the previously traced circuit for operating the test relay R355. Upon operating the test relay R355 interrupts, at the contacts 359, the circuit for operating the rotary magnet M376, thereby positively to prevent further operation thereof and consequently to arrest the trunk-hunting operation above described. Also the test relay R355 completes, at the contacts 357, a circuit, including the contacts 340, for operating the switch-through relay R360. Upon operating the switch-through relay R360 completes, at the contacts 367, a holding circuit, including the contacts 346, for energizing the winding thereof; and completes, at the contacts 366, a direct path, including the contacts 346, for applying ground potential to the control wiper 373 of the Strowger mechanism, as well as a direct connection between the control conductor C323 of the trunk 320 and the control wiper 373 and a path, including the contacts 345 and 347, for short-circuiting the winding of the test relay R355. Also the switch-through relay R360 interrupts, at the contacts 361 and 364, the normal connections between the upper and lower windings of the line relay R350 and the line conductors C321 and C322 of the trunk 320; and completes, at the contacts 362 and 363 connections between the line conductors C321 and C322 and the line wipers 371 and 372 of the Strowger mechanism and consequently the line conductors C301 and C302 of the incoming trunk 300 extending to the repeater 310. Accordingly, at this time an alternative loop circuit is completed between the upper winding of the answer relay R160 in the repeater 110 and the line relay in the repeater 310. At this time the repeater 310 operates to return ground potential over the control conductor C303 of the incoming trunk 300 and consequently to the control wiper 373 of the Strowger mechanism in order to complete an alternative holding circuit, including the contacts 366 and 367, for energizing the winding of the switch-through relay R360 and an alternative path for applying ground potential to the control conductor C323 of the trunk 320 in order to retain the line switch LS327 in its operated position. Also at this time the repeater 310 operates to return ring-back tone current over the line conductor C301 of the incoming trunk 300 and consequently over the connection to the calling switchboard 101 in order to indicate that the called switchboard 301 is being signaled at this time. Finally, the repeater 310 operates to transmit a call signal over the trunk 305 to the repeater 302, whereby the repeater 302 repeats the call signal to the called switchboard 301 indicating to the operator thereat that a call is waiting to be answered on the repeater 302.

When the winding of the test relay R355 is thus short-circuited the latter relay restores shortly thereafter without effect at this time. Also when the circuit for energizing in series the upper and lower windings of the line relay R350 is thus interrupted, the line relay restores without effect at this time. Further upon operating the switch-through relay R360 interrupts, at the contacts 369, the circuit for retaining operated the hold relay R345 in order to cause the latter relay to restore shortly thereafter, it being of the slow-to-release type. Upon restoring the hold relay R345 interrupts, at the contacts 346, the original holding circuit for energizing the winding of the switch-through relay R360 and the original path for applying ground potential upon the control conductor C323 of the trunk 320. Accordingly, at this time the selector S300 and the line switch LS327 are retained in their operated positions from ground potential applied in the repeater 310 to the control conductor C303 of the incoming trunk 300. Finally the switch-through relay R360 completes, at the contacts 365, a connection, including the contacts 388 of the set of switch springs 384, between the EC conductor C324 of the trunk 320 and the EC wiper 374 of the Strowger mechanism; however, without effect at this time since the line switch 327 does not comprise an EC wiper. Accordingly, in the present example no potential is applied via the path including the EC wiper 374 of the Strowger mechanism to the EC conductor C304 of the incoming trunk 300 extending to the repeater 310.

After the operator at the called switchboard 301 receives the call signal indicating the presence of a call waiting to be answered upon the repeater 302 she connects thereto causing the repeater 302 to control the repeater 310, whereby the repeater 310 operates to reverse the polarity of the loop circuit, including the line conductors C301 and C302 of the incoming trunk 300; whereby the upper winding of the answer relay R160 in the repeater 110 is poled to operate. Also the repeater 310 interrupts the return of ring-back tone current over the line conductor C301 of the incoming trunk 300 and consequently this signal over the connection in order to indicate to the operator at the calling switchboard 101 that the operator at the called switchboard 301 has answered the present call. Upon operating the answer relay R160 in the repeater 110 completes, at the contacts 161, a circuit for operating the supervisory relay R135. Upon operating the supervisory relay R135 reverses, at the contacts 136, 137, 138 and 139, the polarity of the loop circuit extending between the repeater 102 and the upper and lower windings of the line relay R120; whereby the repeater 102 operates to return an answer signal to the calling switchboard 101, thereby to indicate the circumstance noted. At this time an established connection is completed for two-way communication between the calling switchboard 101 and the called switchboard 301.

At the conclusion of the established connection, when the operator at the called switchboard 301 disconnects, the repeater 302 is controlled in order to govern the repeater 310; whereby the polarity of the loop circuit, including the line conductors C301 and C302 of the incoming trunk 300 and the upper winding of the answer relay R160 in the repeater 110, is reversed; whereby the answer relay R160 is poled to restore. Upon restoring the answer relay R160 interrupts, at the contacts 161, the circuit for retaining operated the supervisory relay R135. Upon restoring the supervisory relay R135 restores, at the contacts 136, 137, 138 and 139, the polarity of the loop circuit extending between the repeater 102 and the upper and lower windings of the line relay R120; whereby the repeater 102 operates to return a disconnect signal to the calling switchboard 101. The operator at the calling switchboard 101 then disconnects from the repeater 102; whereby the repeater 102 interrupts the loop circuit extending therefrom to the upper and lower windings of the line relay R120 causing the latter relay to restore. Upon restoring the line relay R120 interrupts, at the contacts 122, the circuit for retaining operated the hold relay R130; whereby the latter relay restores shortly thereafter, it being of the slow-to-release type. Upon restoring the hold relay R130 interrupts, at the contacts 131′, the circuit for retaining operated the switch relay R140. Also upon restoring the line relay R120 interrupts, at the contacts 121, the loop circuit including the line conductors C171 and C172 of the outgoing trunk 170 extending to the repeater 310, thereby to effect the subsequent release of the repeater 310. Also the last mentioned loop circuit includes the upper winding of the answer relay R160; whereby the winding mentioned is deenergized. Upon restoring the switch relay R140 interrupts, at the contacts 145, the circuit for energizing the lower winding of the answer relay R160; however, without effect at this time since the answer relay R160 already occupies its restored position. Further the hold relay R130 interrupts, at the contacts 133, the path for applying ground potential to the control conductor C203 of the incoming trunk 200; and recompletes, at the contacts 134, the path for applying battery potential by way of the resistor 149 to the control conductor C203. Accordingly, at this time the incoming trunk 200 and consequently the repeater 110 is again marked as idle to the selector switches S300, etc., having access thereto.

When the repeater 310 is released, ground potential therein is removed from the control conductor C303 of the incoming trunk 300 and consequently from the control wiper 373 of the Strowger mechanism in the selector S300 interrupting the holding circuit for retaining operated the switch-through relay R360. Also ground potential is removed from the control conductor C323 of the trunk 320 in order to effect the release of the line switch LS327. Upon restoring the switch-through relay R360 again completes, at the contacts 361 and 364, the normal connections between the upper and lower windings of the line relay R350 and the line conductors C321 and C322 of the trunk 320. Further, the switch-through relay R360 completes, at the contacts 369, a circuit, including the contacts 352, 345′, and 342′ and the set of switch springs S382, for operating the release magnet M378; whereby the wiper carriage of the Strowger mechanism is released and returned to its normal rotary and vertical positions. When the wiper carriage of the Strowger mechanism is thus released, the sets of switch springs S381, S382 and S383 and S384 are operated. More particularly, the set of switch springs S382 is operated to interrupt the circuit for operating the release magnet M378; the set of switch springs S384 is operated in order to close the contacts 385 thereof, again connecting the control wiper 373 and the EC wiper 374 of the Strowger mechanism; and the set of switch springs S383 is operated in order again to apply battery potential via the upper winding of the transfer relay R340 to the control conductor C323 of the trunk 320. Accordingly, at this time the trunk 320 and consequently the selector S300 is marked as idle to the various line switches LS325, etc., having access thereto. At this time the established connection between the calling switchboard 101 and the called switchboard 301 is released and all of the apparatus involved therein is completely released and available for further use.

The extension of a call from the calling switchboard 301 in the office 30 to the called switchboard 101 in the office 10 is the same as the extension of such a call in the opposite direction as described above. Specifically, the operator at the calling switchboard 301 connects to an idle repeater, such for example, as the repeater 302; whereby the repeater 302 seizes the repeater 310 over the trunk 305. The repeater 310 operates to seize the line switch LS325 over the outgoing trunk 326 and to mark the incoming trunk 300 as busy to the selectors S300, etc., having access thereto. The line switch LS325 operates to seize an idle selector S300, etc. Assuming that the line switch LS325 selects the trunk 320 extending to the particular selector S300, dial tone in the selector S300 is returned over the connection and the operator at the switchboard 300 proceeds to dial the single digit comprising the directory number of the called switchboard 101. Initially, a loop circuit is completed between the repeater 310 and the upper and lower windings of the line relay R350 in the selector S300; whereby the latter relay follows the impulses of the present digit bringing about operation of the selector S300 in the manner previously explained. In the present example, the Strowger mechanism first selects the group of incoming trunks, including the incoming trunk 200 extending to the repeater 110, and then an idle incoming trunk in this group. For example, the selector S300 may select the particular incoming trunk 200, the trunk 200 being marked as idle by the application of battery potential via the resistor 149 and the previously traced path to the control conductor C203 thereof. When the Strowger mechanism selects the incoming trunk 200, the test relay R355 and then the switch-through relay R360 are operated; whereby the line relay R350, the test relay R355 and the hold relay R345 are restored; all in the manner previously explained. More particularly, the switch-through relay R360 completes, at the contacts 362 and 363, a loop circuit, also including the line wipers 371 and 372 of the Strowger mechanism, the line conductors C201 and C202 of the incoming trunk 200, the contacts 272 and 274, the windings 129 and 128 of the repeating coil 125, and the contacts 142 and 144 for energizing in series the upper and lower windings of the line relay R210 in the repeater 110 via the line conductors C321 and C322 of the trunk 320 and the connection back to the repeater 310; whereby the line relay R210 operates.

Upon operating the line relay R210 completes, at the contacts 211, a circuit for operating the hold relay R230; and completes, at the contacts 212, a circuit for operating the supervisory relay R135. Upon operating the hold relay R230 completes, at the contacts 233, a circuit for operating the control relay R240; and completes, at the contacts 231, a path for applying ground potential by way of the lower winding of the tone start relay R220 to the control conductor C203 of the incoming trunk 200. The tone start relay R220 then operates to complete, at the contacts 221, a path for applying ground potential to the tone start conductor C222 in order to insure the application of ring-back tone upon the ring-back tone conductor C124. Upon operating the control relay R240, completes, at the contacts 242, a path, including the contacts 131, 151 and 272, for connecting the ring-back tone conductor C124 to the line conductor C201 of the incoming trunk 200; whereby ring-back tone current is returned over the connection in order to indicate to the operator at the calling switchboard 301 that the called switchboard 101 is being signaled. Upon operating the supervisory relay R135 reverses, at the contacts 136, 137, 138 and 139, the polarity of the connection between the upper and lower windings of the line relay R120 and the line conductors C106 and C107 of the trunk 105; whereby the repeater 102 is governed over the trunk 105 to transmit a call signal to the called switchboard 101 indicating that a call is waiting to be answered upon the repeater 102. The operator at the called switchboard 101 answers the call by connecting to the repeater 102; whereby the repeater 102 is controlled to complete a loop circuit for energizing in series the upper and lower windings of the line relay R120 causing the latter relay to operate. Upon operating the line relay R120 completes, at the contacts 122, the circuit for operating the hold relay R130, and a multiple circuit, also including the contacts 241 and the resistor 275, for operating the supervisory relay R270. At this point it is noted that the supervisory relay R270 is operated since ground potential in the selector S300 is not applied to the EC wiper 374 of the Strowger mechanism and consequently to the EC conductor C204 of the incoming trunk 200. Upon operating the supervisory relay R270 reverses, at the contacts 271, 272, 273 and 274, the polarity of the loop circuit, including the line conductors C201 and C202 of the incoming trunk 200 extending between the line relay R210 and the repeater 310. Upon operating the hold relay R130 interrupts, at the contacts 131, the path for returning ring-back tone current over the connection to the calling switchboard 301 in order to indicate to the operator thereat that the call has been answered at the called switchboard 101. Also the hold relay R130 completes, at the contacts 131', a circuit, including the contacts 246 and 266, for operating the answer relay R250. Upon operating the answer relay R250 completes, at the contacts 251 and 252, a path, including the contacts 271 and 273, for bridging the upper winding of the tone start relay R220 across the line conductors C201 and C202; whereby any tone current traversing the lower winding of the tone start relay R220 via the control conductor C203 of the incoming trunk 200 may induce a corresponding tone current in the upper winding of the tone start relay R220 causing this tone current to be supplied via the repeating coil 125, the trunk 105, and the repeater 102 to the called switchboard 101. This arrangement permits identification of the class of a calling telephone station or the like in the exchange 20 to the operator at the called switchboard 101; which circumstance is not present in this example and is consequently of no present utility.

Also upon operating the answer relay R250 closes the contacts 253 and sets its armature RA254 into vibration; whereby the contacts 253 are closed intermittently energizing the winding of the timer relay R260. Since the timer relay R260 is of the slow-to-operate type, operation thereof is accordingly delayed. Upon operating the timer relay R260 completes, at the contacts 265, a holding circuit, including the contacts 246 and 131', for energizing the winding thereof; completes, at the contacts 261, a direct path for short-circuiting the lower winding of the tone start relay R220 and a direct multiple path for applying ground potential to the control conductor C203 of the incoming trunk 200; and completes, at the contacts 263, a holding circuit, including the contacts 232, for retaining operated the hold relay R230. Also the timer relay R260 interrupts, at the contacts 266, the circuit for retaining operated the answer relay R250; whereby the latter relay restores to interrupt, at the contacts 251, 252 the path for connecting the upper winding of the tone start relay R220 across the line conductors C201 and C202 of the incoming trunk 200 in order to cut off the tone testing arrangement previously described.

When the polarity of the loop circuit including the line conductors C201 and C202 of the incoming trunk 200 is reversed between the upper and lower windings of the line relay R210 and the repeater 310, the repeater 310 is operated to govern the repeater 302 over the trunk 305; whereby the repeater 302 returns an answer signal to the calling switchboard 301 indicating the circumstance noted. At this time an established connection is completed for two-way communication between the calling switchboard 301 and the called switchboard 101.

At the conclusion of the established connection, when the operator at the called switchboard 101 disconnects, the repeater 102 is controlled to interrupt the loop circuit extending via the trunk 105 to the upper and lower windings of the line relay R120 in order to cause the latter relay to restore. Upon restoring the line relay R120 interrupts, at the contacts 122, the circuit for retaining operated the hold relay R130; whereby the latter relay restores shortly thereafter, it being of the slow-to-release type. Also the line relay R120 interrupts, at the contacts 122, the multiple circuit for retaining operated the supervisory relay R270; whereby the latter relay restores, at the contacts 271, 272, 273 and 274, the polarity of the loop circuit, including the line conductors C201 and C202 of the incoming trunk 200 between the upper and lower windings of the line relay R210 and the repeater 310; whereby the repeater 310 controls the repeater 302 over the trunk 305 in order to cause the repeater 302 to transmit a disconnect signal to the calling switchboard 301 indicating the circumstance noted. Upon restoring the hold relay R130 interrupts, at the contacts 131', the holding circuit for retaining operated the timer relay R260. Subsequently, when the operator at the calling switchboard 301 disconnects the repeater 302 controls the repeater 310 over the trunk 305; whereby the repeater 310 interrupts the loop circuit extending via the incoming trunk 200 to the upper and lower windings of the line relay R210 causing the latter relay to restore. Upon restoring the line relay R210 interrupts, at the contacts 212, the circuit for retaining operated the supervisory relay R135. Upon restoring the supervisory relay R135 restores, at the contacts 136, 137, 138 and 139, the polarity of the line conductors C106 and C107 of the trunk 105 with respect to the upper and lower windings of the line relay R120. Also the line relay R210 interrupts, at the contacts 211, the circuit for retaining operated the hold relay R230; whereby the latter relay restores shortly thereafter, it being of the slow-to-release type. Upon restoring the hold relay R230 interrupts, at the contacts 233, the circuit for retaining operated the control relay R240; and interrupts, at the contacts 231, the path for applying ground potential by way of the lower winding of the tone start relay R220 to the control conductor C203 of the incoming trunk 200 and consequently to the control wiper 373 of the Strowger mechanism and the control conductor C323 of the trunk 320. At this time the selector S300 and the line switch LS325 are released in the manner previously explained. Upon restoring the control relay R240 recompletes, at the contacts 244, the path for applying battery potential by way of the resistor 149 to the control conductor C203 of the incoming trunk 200 in order again to mark the incoming trunk 200 and consequently the repeater 110 as idle to the selectors S300, etc., having access thereto. When the selector S300 is released, the set of switch springs S383 is operated in order again to apply battery potential by way of the upper winding of the transfer relay R340 to the control conductor C323 of the trunk 320 in order again to mark the trunk 320 and consequently the selector S300 as idle to the line switches LS325, etc., having access thereto. At this time, the established connection between the calling switchboard 301 and the called switchboard 101 is released, and all of the apparatus involved therein is completely released and available for further use.

In view of the foregoing it will be understood that a call from the calling switchboard 101 in the office 10 may be extended to a called subscriber substation or paystation in the exchange 20 in a manner similar to that described above. For example, a call from the calling switchboard 101 in the office 10 to the called paystation T303 in the exchange 20 may be first routed via the repeater 102, the trunk 105, the repeater 110, the outgoing trunk 170, the line switch LS327, and the trunk 320 to the selector S300. Thereupon the operator at the calling switchboard 101 dials the three digits comprising the directory number of the called paystation T303. The selector S300 follows the first digit selecting first the group of connectors, including the connector 335, and then an idle connector therein. For example, the selector S300 may select the particular trunk 330 extending to the connector 335. The connector 335 then responds to the second and third digits to select the telephone line 304 extending to the called paystation T303; whereby the subsequent operation of the connector 335 depends upon the idle or busy condition of the called paystation T303 at this time in accordance with conventional practice. Assuming that the paystation T303 is idle at this time, the connector 335 operates to project ringing current over the telephone line 304 and to return ring-back tone current over the trunk 330 and consequently to the calling switchboard 101 in order to indicate the circumstance noted. When a person at the called paystation T303 answers the call, the connector 335 switches through completing an established connection between the calling switchboard 101 and the called paystation T303 and operates to reverse the polarity of the line conductors C331 and C332 of the trunk 330 and consequently the polarity of the loop circuit extending back to the upper winding of the answer relay R160 in the repeater 110 causing the latter relay to operate. The answer relay R160 effects the operation of the supervisory relay R135 and the consequent reversal of polarity of the line conductors C106 and C107 of the trunk 105; whereby the repeater 102 is controlled to return an answer signal to the calling switchboard 101 in order to indicate to the operator thereat the circumstance noted. At this time an established connection is completed between the calling switchboard 101 and the called paystation T303.

At the conclusion of the established connection when the person at the called paystation T303 disconnects the connector 335 operates to restore the polarity of the line conductors C331 and C332 of the trunk 330 effecting the consequent restoration of the answer relay R160 and the supervisory relay R135 in the repeater 110. The supervisory relay R135 restores the polarity of the line conductors C106 and C107 of the trunk 105 causing the repeater 102 to return a disconnect signal to the calling switchboard 101 in order to indicate to the operator thereat the circumstance noted. When the operator at the calling switchboard 101 then disconnects the repeater 102 is released effecting the release of the repeater 110 and the consequent release of the line switch LS327, the selector S300 and the connector 335 in a manner similar to that previously explained. When the connector 335 is thus released, the telephone line 304 extending to the called paystation T303 is again marked as idle to the connectors 335, etc., having access thereto. At this time the established connection between the calling switchboard 101 and the called paystation T303 is released and all of the apparatus involved therein is completely released and available for further use.

In view of the foregoing description, it will be readily understood that a call may be extended in a substantially identical manner from the calling switchboard 301 in the office 30 to a called subscriber substation or paystation in the exchange 20.

Assuming now that a call is to be extended from a calling subscriber substation or paystation, such for example, as the calling paystation T303 in the exchange 20 to the called switchboard 101 in the office 10, the person at the paystation T303 first initiates the call. The paystation T303 may be of the post-payment type; whereby the present call is immediately initiated without the deposit of a coin thereat. More particularly, the line switch LS305 is controlled over the telephone line 304 extending to the paystation T303 and operates in order to select an idle trunk in the group, including the trunk 320. For example, the line switch LS305 may select the particular trunk 320 extending to the selector S300; whereby the selector S300 is seized, the line relay R350 therein operating over a loop circuit extending back to the calling paystation T303.

The person at the calling paystation T303 then dials the single digit comprising the directory number of the called switchboard 101; whereby the line relay R350 follows effecting operation of the selector S300 in a manner substantially identical to that previously explained. More particularly, the selector S300 is operated to cause the Strowger mechanism to select the group of incoming trunks, including the incoming trunk 200, and then an idle incoming trunk therein. For example, the Strowger mechanism may select the particular incoming trunk 200 extending to the repeater 110; whereby the test relay R355 and the switch-through relay R360 in the selector S300 operate. The switch-through relay R360 effects the subsequent restoration of the test relay R355 and the line relay R350 and the hold relay R345. Specifically, the line relay R210 in the repeater 110 is operated over the loop circuit including the line conductors C201 and C202 of the incoming trunk 200 and the line conductors C321 and C322 of the trunk 320 extending back to the calling paystation T303. Upon operating the line relay R210 effects the operation of the hold relay R230 and the consequent operation of the control relay R240. Also the line relay R210 effects the operation of the supervisory relay R135; and the hold relay R230 effects the operation of the tone start relay R220. At this time the set of switch springs S384 in the selector S300 is again operated; whereby the EC wiper 374 of the Strowger mechanism is connected via the contacts 386 of the set of switch springs S384 and the contacts 365 to the EC conductor C324 of the trunk 320.

In the present example, ground potential in the line switch LS305 individual to the telephone line 304 extending to the calling paystation T303 is applied via the EC wiper thereof to the EC conductor C324 of the trunk 320 completing a path also including the EC conductor C204 of the incoming trunk 200 for applying ground potential to the adjacent terminal of the supervisory relay R270 and effectively removing the application of battery potential through the resistor 275 from the adjacent terminal of the supervisory relay R270; all for a purpose more fully explained hereinafter. Also, at this time, battery potential having paystation tone superimposed thereon is applied in the line switch LS305 via the control wiper thereof to the control conductor C323 of the trunk 320 and consequently extends via the control wiper 373 of the Strowger mechanism and the control conductor C203 of the incoming trunk 200 through the lower winding of the tone start relay R220 inducing a corresponding paystation tone in the upper winding thereof for a purpose more fully explained hereinafter. At this time the operated control relay R240 causes ring-back tone from the ring-back tone conductor C124 to be returned over the connection including the line conductor C201 of the incoming trunk 200 to the calling paystation T303 indicating to the person thereat that the operator at the called switchboard 101 is being signaled at this time. The operated supervisory relay R135 effects the reversal of polarity over the trunk 105 to the repeater 102; whereby the repeater 102 operates to transmit a call signal to the switchboard 101 indicating to the operator thereat the circumstance that a call is waiting to be answered on the repeater 102.

When the operator at the called switchboard 101 answers the call by connecting to the repeater 102, the line relay R120 in the repeater 110 is operated effecting operation of the hold relay R130 and the consequent operation of the answer relay R250. Upon operating the answer relay R250 bridges the upper winding of the tone start relay R220 across the line conductors C201 and C202 of the incoming trunk 200 and thereafter effects operation of the timer relay R260. The timer relay R260 then effects the restoration of the answer relay R250 and short-circuiting of the lower winding of the tone start relay R220. Upon restoring the answer relay R250 disconnects the upper winding of the tone start relay R220 from across the line conductors C201 and C202 of the incoming trunk 200. During the short-time interval that the upper winding of the tone start relay R220 is bridged across the line conductors C201 and C202 of the incoming trunk 200 the paystation tone induced therein from the lower winding thereof is impressed via the repeating coil 125 and the trunk 105 upon the repeater 102 and consequently is returned to the called switchboard 101 indicating to the operator thereat that the present call originates at a paystation in the exchange 20.

Also when the call is answered at the called switchboard 101, the line relay R120 upon operating completes, at the contacts 122, a path, including the contacts 241 and the grounded EC conductor C204 of the incoming trunk 200 for short-circuiting the winding of the supervisory relay R270 in order positively to prevent operation of the latter relay and the consequent reversal of the polarity of the loop circuit extending via the line conductors C201 and C202 of the incoming trunk 200 between the upper and lower windings of the line relay R210 and the calling paystation T303. This arrangement preventing the reversal of polarity of the loop circuit extending back to the calling paystation T303 prevents normal operation of apparatus disposed therein and the consequent blocking of the transmitter of the telephone instrument at the calling paystation T303. In passing it is noted that had this apparatus mentioned operated to block operation of the transmitter of the telephone instrument at the calling paystation T303, the block mentioned could have been removed only by the deposit of a coin at the calling paystation T303. However, since the polarity of the loop circuit extending back to the calling paystation T303 is not reversed, the apparatus mentioned is not operated and the person at the calling paystation T303 may converse with the operator at the called switchboard 101; all without depositing a coin at the calling paystation T303. This arrangement permits free calls from the calling paystation T303 to the called switchboard 101. At this time an established connection is completed for two-way communication between the calling paystation 303 and the called switchboard 101.

At the conclusion of the established connection, when the person at the calling paystation T303 disconnects the loop circuit extending via the line conductors C201 and C202 of the incoming trunk 200 to the line relay R210 in the repeater 110 is interrupted causing the latter relay to restore and effect the restoration of the supervisory relay R135; whereby the latter relay restores the polarity of the loop circuit extending via the trunk 105 between the repeater 102 and the line relay R120 causing the repeater 102 to return a disconnect signal to the called switchboard 101 indicating to the operator therat the circumstance noted. When the operator at the called switchboard then disconnects from the repeater 102, the repeater 102 and the repeater 110 are released effecting the release of the selector S300 and the line switch LS305; all in a manner substantially identical to that previously explained. When the repeater 110 is thus released the incoming trunk 200 is again marked as idle to the selector S300, etc., having access thereto; and when the line switch LS305 is thus released the telephone line 304 extending to the paystation T303 is again marked as idle to the connectors 335, etc., having access thereto. At this time the established connection between the calling paystation T303 and the called switchboard 101 is released and all of the apparatus involved therein is completely released and available for further use.

In view of the foregoing description it will be understood that a call initiated at a paystation, such for example, as the paystation T303 in the exchange 20 may be extended in a substantially identical manner via the telephone line 304, the line switch LS305, the trunk 320, the selector S300, the incoming trunk 300, the repeater 310, the trunk 305 and the repeater 302 to the called switchboard 301 in the office 30. In this case the person at the calling paystation T303 dials a single digit comprising the directory number of the called switchboard 301 after the line switch LS305 has seized the selector S300. Again the line switch LS305, the set of switch springs S384, the EC wiper 374 of the Strowger mechanism and the EC conductor C394 of the incoming trunk 300 are utilized in order to prevent operation of the supervisory relay in the repeater 310 when the call is answered at the called switchboard 301. Thus it will be understood that a call may be extended from the calling paystation T303 to the called switchboard 301 without depositing a coin at the calling paystation T303.

Finally, considering the extension of a local call from a calling subscriber subscription or paystation to a called subscriber substation or paystation in the exchange 20, and by way of example assume that a call is to be extended from the calling paystation T303 to the called paystation T306, the person at the calling paystation T303 initiates the call; whereby the line switch LS305 may select the trunk 320 extending to the selector S300, whereupon the person at the calling paystation T303 dials the three digits comprising the directory number of the called paystation T306. The selector S300 follows the first digit selecting the group of trunks, including the trunk 330, and then an idle trunk in the selected group. For example, the selector S300 may select the particular trunk 330 extending to the connector 335. The connector 335 then responds to the second and third digits to select the telephone line 307 extending to the called paystation T306. The subsequent operation of the connector 335 depends upon the idle or busy condition of the called paystation T306 at this time in accordance with conventional practice; and assuming that the called paystation T306 is idle at this time, the connector 335 operates to project ringing current over the telephone line 307 to the called paystation T306 and to return ring-back tone current over the connection including the telephone line 304 to the calling paystation T303. When the person at the called paystation T306 answers the call, the connector 335 is switched through interrupting the projection of ringing current over the telephone line 307 and the return of ring-back tone current over the connection including the telephone line 304. Also the connector 335 operates to reverse the polarity of the loop circuit extending between the line relay in the connector 335 and the calling paystation T303; whereby the apparatus at the calling paystation T303 operates to block the transmitter of the telephone instrument thereat in order to prevent conversation between the person at the calling paystation T303 and the person at the called paystation T306. The person at the calling paystation T303 may remove this blocked condition of the transmitter of the telephone instrument thereat by depositing a coin at the calling paystation T303; whereby the transmitter of the telephone instrument thereat is rendered operative so that two-way conversation may take place between the calling paystation T303 and the called paystation T306. The subsequent release of this established connection is in accordance with conventional practice; whereupon the coin deposited at the calling paystation T303 is collected.

In view of the foregoing it is apparent that there has been provided in an automatic telephone system, an improved switching repeater arrangement for selectively extending connections from a calling operator switchboard or from a calling telephone station to a called operator switchboard; wherein the repeater is seized over a common channel in either case and wherein the repeater is selectively governed by the switching apparatus in accordance with the origin of the call in order selectively to control the reversal of polarity over the common channel incident to answering of the call at the called operator switchboard.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a first operator position, a telephone station, a switch including a pair of line wipers and a test wiper and a control wiper; a repeater including a supervisory relay, a second operator position, means controllable from said first operator position for extending a connection therefrom to said switch, means controllable from said telephone station for extending a connection therefrom to said switch, means then controllable over either of said connections for operating said switch to test via said test wiper said repeater, means for causing said switch to seize said repeater in the event it is tested as idle means governed only in the event said connection is extended to said switch from said telephone station for establishing a blocking control via said control wiper over said relay, means then for extending a call from said repeater to said second operator position, means responsive to answering of said call at said second operator position for operating said relay in the event said blocking control is not established thereover, means responsive to operation of said relay for reversing the polarity of said connection over said line wipers, and means responsive to the reversal of polarity of said connection for returning an answer signal to said first operator position.

2. In a telephone system, a first operator position, a telephone station, a switch including a pair of line wipers and a test wiper and a control wiper, a repeater including a supervisory relay provided with a winding, a second operator position, means controllable from said first operator position for extending a connection therefrom to said switch, means controllable from said telephone station for extending a connection therefrom to said switch, means then controllable over either of said connections for operating said switch to test via said test wiper said repeater, means for causing said switch to seize said repeater in the event it is tested as idle, means then for extending a call from said repeater to said second operator position, means responsive to answering of said call at said second operator position for energizing the winding of said relay in the event said connection is extended to said switch from said first operator position, means responsive to answering of said call at said second operator position for short-circuiting the winding of said relay via said control wiper in the event said connection is extended to said switch from said telephone station, said relay operating when the winding thereof is energized, means responsive to operation of said relay for reversing the polarity of said connection over said line wipers, and means responsive to the reversal of polarity of said connection for returning an answer signal to said first operator position.

3. In a telephone system, a first operator position, a telephone station, a switch including a pair of line wipers and a test wiper and a control wiper, a repeater including a supervisory relay provided with a winding, means normally connecting a first potential via a resistor to one terminal of the winding of said relay, a second operator position, means controllable from said first operator position for extending a connection therefrom to said switch, means controllable from said telephone station for extending a connection therefrom to said switch, means then controllable over either of said connections for operating said switch to test via said test wiper said repeater, means for causing said switch to seize said repeater in the event it is tested as idle, means governed only in the event said connection is extended to said switch from said telephone station for connecting a second potential via said control wiper to said one terminal of the winding of said relay, said second potential in the event it is connected to said one terminal of the winding of said relay overriding said first potential connected thereto via said resistor, means then for extending a call from said repeater to said second operator position, means responsive to answering of said call at said second operator position for connecting said second potential to the other terminal of the winding of said relay, the winding of said relay being energized in the event said first and second potentials are respectively connected to said one and other terminals thereof and being short-circuited in the event said second potential is connected to both of said terminals thereof, said relay operating when the winding thereof is energized, means responsive to operation of said relay for reversing the polarity of said connection over said line wipers, and means responsive to the reversal of polarity of said connection for returning an answer signal to said first operator position.

4. In a telephone system, a first operator position, a telephone station, a switch including a pair of line wipers and a test wiper and a control wiper and a device normally connecting said control wiper to said test wiper, a repeater including a supervisory relay provided with a winding, means normally connecting a first potential via a resistor to one terminal of the winding of said relay, a second operator position, means controllable from said first operator position for extending a connection therefrom to said switch, means controllable from said telephone station for extending a connection therefrom to said switch, means then controllable over either of said connections for operating said switch to test via said test wiper said repeater and for operating said device to disconnect said control wiper from said test wiper, means for causing said switch to seize said repeater in the event it is tested as idle, means governed only in the event said connection is extended to said switch from said telephone station for connecting a second potential via said device and said control wiper to said one terminal of the winding of said relay, said second potential in the event it in connected to said one terminal of the winding of said relay overriding said first potential connected thereto via said resistor, means then for extending a call from said repeater to said second operator position, means responsive to answering of said call at said second operator position for connecting said second potential to the other terminal of the winding of said relay, the winding of said relay being energized in the event said first and second potentials are respectively connected to said one and other terminals thereof and being short-circuited in the event said second potential is connected to both of said terminals thereof, said relay operating when the winding thereof is energized, means responsive to operation of said relay for reversing the polarity of said connection over said line wipers, and means responsive to the reversal of polarity of said connection for returning an answer signal to said first operator position.

5. In a telephone system, a first operator position, a telephone station, a switch including a pair of line wipers and a test wiper and a control wiper, a repeater including a trunk provided with a pair of line conductors and a test conductor and a control conductor, said repeater also including a supervisory relay provided with a winding, a second operator position, means controllable from said first operator position for extending a connection therefrom to said switch, means controllable from said telephone station for extending a connection therefrom to said switch, means then controllable over either of said connections for operating said switch to test via said test wiper said test conductor, means for causing said switch to seize said trunk in the event said test conductor is tested as idle, means then for extending a call from said repeater to said second operator position, means responsive to answering of said call at said second operator position for energizing the winding of said relay in the event said connection is extended to said switch from said first operator position, means responsive to answering of said call at said second operator position for short-circuiting the winding of said relay via said control conductor and said control wiper in the event said connection is extended to said switch from said telephone station, said relay operating when the winding thereof is energized, means responsive to operation of said relay for reversing the polarity of said connection over said line conductors and said line wipers, and means responsive to the reversal of polarity of said connection for returning an answer signal to said first operator position.

CLARENCE E. LOMAX.

REFERENCES CITED

The following references are of record in the file of this patent:

UNITED STATES PATENTS

| Number | Name | Date |
|---|---|---|
| 1,924,095 | Griffins | Aug. 29, 1933 |
| 2,137,409 | Martin | Nov. 22, 1938 |
| 2,214,245 | Evers | Sept. 10, 1940 |
| 2,248,575 | Lomax | July 8, 1941 |
| 2,367,769 | Goddard | Jan. 23, 1945 |